Patented Aug. 17, 1954

2,686,775

UNITED STATES PATENT OFFICE 2,686,775

POLYMERIZATION PROCESS EMPLOYING HYDRAZIDE/OXIDANT/COPPER SALT INITIATOR SYSTEMS

Edward G. Howard, Jr., Wilmington, Del., assignor to E. I. du Pont de Nemours and Company, Wilmington, Del., a corporation of Delaware No Drawing. Application March 29, 1951, Serial No. 218,267

13 Claims. (Cl. 260—88.7)

This invention relates to the addition polymerization of polymerizable organic compounds and more particularly to new polymerization catalyst systems.

This application is a continuation-in-part of my copending application Serial No. 148,015, filed March 6, 1950.

Polymerization of ethylenically unsaturated compounds is a process of great technical importance. Generally employed as polymerization catalysts are compounds containing directly linked oxygen atoms such as benzoyl peroxide or potassium persulfate. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low. Accordingly, new and improved systems of low temperature addition polymerization in high conversion are of considerable interest.

This invention has as an object the provision of a new process for polymerization of ethenoid monomers subject to addition polymerization. A further object is the provision of a new initiator system for the polymerization of compounds subject to addition polymerization. Other objects will appear hereinafter.

These objects are accomplished by this invention wherein a monomer subject to addition polymerization by reason of a non-aromatic carbon to carbon double bond is polymerized by bringing the monomer in contact with cupric ion, an acyl hydrazine and an oxidizing agent of the class consisting of periodate ion, bromate ion, peroxy compounds, vicinal aliphatic diketones, and quinones.

The following examples in which parts are by weight are illustrative of the invention.

EXAMPLE I

A glass container was charged with 40 parts of ethyl alcohol, 55 parts of distilled water, 12.5 parts of methyl methacrylate, 1.4 parts of a 3% solution of hydrogen peroxide in water (oxidizing agent), 0.02 part of cupric chloride dihydrate, and 0.22 part of benzenesulfonylhydrazide ($C_6H_5SO_2NHNH_2$)

The container was flushed with nitrogen and the vessel sealed. After four hours at 25° C., the polymer was removed by filtration and dried. There was obtained 11.6 parts of polymer corresponding to a 93% conversion.

When the hydrazide was absent, no polymerization occurred.

EXAMPLE II

When the general procedure of Example I was repeated except that in place of the hydrogen peroxide, 0.19 part of quinone was present, a 95% yield of polymer in 20 hours was obtained.

EXAMPLE III

The general procedure of Example II was repeated except that 1-benzenesulfonyl-2-phenyl-hydrazine ($C_6H_5SO_2NHNHC_6H_5$) was employed as the hydrazine compound. A 64% conversion was obtained.

EXAMPLE IV

When the general procedure of Example I was repeated except that benzoylhydrazide ($C_6H_5CONHNH_2$)

was used in place of the benzenesulfonylhydrazide, there was obtained a 90% conversion of the monomer to polymer.

EXAMPLE V

The general procedure of Example I was repeated except that diacetylhydrazine ($CH_3CONHNHCOCH_3$)

paraperiodic acid ($HIO_4 \cdot 2H_2O$) and cupric chloride were employed as the polymerization catalyst system. A 95% yield of polymer was obtained in 24 hours.

EXAMPLE VI

A glass vessel was charged with 15.6 parts of vinyl chloride, 55 parts of ethyl alcohol, 50 parts of water, 0.43 part of benzenesulfonylhydrazide, 2.8 parts of a 3% solution of hydrogen peroxide in water, and 0.04 part of cupric chloride dihydrate. After four hours at 25° C., a 49% conversion of monomer to polyvinyl chloride was obtained. The polymer had a relative viscosity of 1.102 as measured on a 0.1 g. portion in 100 ml. of solution in cyclohexanone.

EXAMPLE VII

When the general procedure of Example VI was repeated except that benzoylhydrazide was used in place of the benzenesulfonylhydrazide, a 17% conversion to polymer was obtained in 24 hours. The relative viscosity of the polymer was 1.102.

EXAMPLE VIII

The general procedure of Example VI was repeated except that 0.29 part of diacetylhydrazine and 0.57 part of paraperiodic acid were employed in place of the hydrazide and peroxide. A 30% conversion to polyvinyl chloride was obtained in four hours. The relative viscosity of the polymer was 1.192.

EXAMPLE IX

A glass vessel was charged with 13.2 parts of acrylonitrile, 220 parts of water, 0.43 part of benzenesulfonylhydrazide, 0.27 part of quinone and 0.04 part of cupric chloride dihydrate. After six hours at 25° C. a 68% yield of polymer was obtained. After 20 hours, 84% of the monomer had been converted to polymer.

In contrast, when the cupric chloride activator was omitted in a further experiment, only a 38% yield of polymer was obtained in 20 hours. Omission of both the oxidizing agent (quinone) and the copper salt (activator) resulted in less than 2% polymerization at 40° C. for 20 hours.

EXAMPLE X

When the general procedure of Example IX (first part) was repeated except that 2.8 parts of an aqueous solution of 3% hydrogen peroxide was used in place of the quinone, a 77% yield of polyacrylonitrile was obtained in two hours. When the copper salt was omitted, only a trace of polymer was evident in two hours. When the peroxide was omitted, no polymer resulted in three hours. When both the copper and peroxide were omitted, no polymerization took place in three hours.

EXAMPLE XI

When the general procedure of Example IX was repeated except that 0.57 part of paraperiodic acid was present as the oxidizing agent, a 58% conversion of monomer to polyacrylonitrile was obtained in 24 hours.

EXAMPLE XII

A glass container was charged with 21.2 parts of acrylonitrile, 79 parts of ethyl alcohol, 1 part of 1 - benzenesulfonyl - 2 - phenylhydrazine, 0.86 part of quinone, and 0.07 part of cupric chloride dihydrate. After four hours at 40° C. a 43% conversion was obtained.

In contrast to the polymerization thus obtained, when the cupric chloride was omitted, a 9% yield was obtained. Substitution of the cupric chloride by cobalt chloride, silver nitrate, manganese acetate, ferrous sulfate, nickel cyanide, mercuric chloride, lead acetate or ferric chloride gave lower yields (up to 7% in 20 hours) of black polymer. Quinones other than quinone, e. g., chloranil and anthraquinone, may be employed. Quinone however gives preferred resuts.

EXAMPLE XIII

A glass container was charged with 13.2 parts of acrylonitrile, 220 parts of water, 0.78 part of 1-benzenesulfonyl-2-phenylhydrazine, 0.34 part of diacetyl and 0.04 part of cupric chloride dihydrate. In 20 hours at 0° C. a 47% conversion to polyacrylonitrile was obtained. Other vicinal diketones, e. g., benzil, may be employed.

EXAMPLE XIV

When the general procedure of Example XIII was repeated except that hydrogen peroxide was used in place of diacetyl and the temperature was 25° C. for 2.5 hours, a 68% yield of polymer was obtained. In the absence of the cupric salt the yield was only 11%.

EXAMPLE XV

Into a pressure bottle having a capacity of about 375 parts by weight of water was placed 0.86 part of benzenesulfonylhydrazide, 0.042 part of cupric chloride dihydrate, 60 parts of deoxygenated water, 100 parts of 95% ethanol, and 11 parts of allyl glycidyl ether under an atmosphere of oxygen-free nitrogen. The bottle and contents were cooled with Dry Ice, after which 17 parts of 3% aqueous hydrogen peroxide and 25.5 parts of vinyl chloride were charged and the reactor sealed. The bottle was shaken at intervals while the reaction mixture warmed to room temperature (28° C.). Within half an hour at 28° C. a white curdy precipitate began to form, and the precipitate became very heavy in three hours. No apparent change was observed after the initial three hour period. At the end of 18 hours the bottle was cooled in Dry Ice and the cap removed, after which unreacted vinyl chloride was allowed to escape at room temperature. The semi-solid residual mixture was diluted with water and thoroughly churned with a high speed stirrer, filtered, agitated with fresh water, refiltered and finally washed on the filter with methanol. The product was then dried in a vacuum desiccator to yield 20.1 parts of a white powdery solid which analyzed for 46.84% chlorine. This indicated that the copolymer contained 82.5% vinyl chloride and 17.5% allyl glycidyl ether. The copolymer was soluble in cyclohexanone, a 30% solution having a viscosity of 0.93 poise at 25° C.

EXAMPLE XVI

A vessel was charged with 13.2 parts of acrylonitrile, 220 parts of water, 0.34 part of benzoylhydrazide, 2.8 parts of an aqueous solution containing 3% hydrogen peroxide, and 0.04 part of cupric chloride dihydrate. In two hours at 25° C. 73% conversion to polyacrylonitrile was obtained.

In contrast to the rapid polymerization in the above, when no cupric salt was present no polymerization occurred in two hours and only 22% conversion took place in 24 hours, when the hydrogen peroxide was omitted no polymerization occurred in three hours, and when both copper salt and hydrogen peroxide were omitted, no polymerization occurred in three hours. Omission of the hydrazide resulted in no polymerization even in 24 hours. Omission of both copper and hydrazide resulted in no polymerization even in 72 hours.

EXAMPLE XVII

When the general procedure of Example XVI (first part) was repeated except that diacetylhydrazine and paraperiodic acid were employed in place of the hydrazide and peroxide, a 49% yield of polymer was obtained in four hours.

EXAMPLE XVIII

A glass vessel was charged with 13.2 parts of acrylonitrile, 40 parts of ethyl alcohol, 50 parts of water, 0.59 part of arylacylhydrazonitrile as specified below, 5.7 parts of a 3% aqueous solution of hydrogen peroxide and 0.02 part of cupric chloride dihydrate. The polymerization was carried out at 25° C. for one hour. The table below indicates the results obtained with various acylhydrazonitriles.

Table

| Acylhydrazinonitrile | Yield of Polymer, Percent |
|---|---|
| Benzenesulfonylhydrazoisobutyronitrile $C_6H_5SO_2NHNHC(CN)(CH_3)_2$ [1] | 70 |
| Benzoylhydrazoisovaleronitrile $C_6H_5CONHNHCH(CN)CH(CH_3)_2$ [2] | 65 |
| Benzoylhydrazoisobutyronitrile $C_6H_5CONHNHC(CN)(CH_3)_2$ [3] | 73 |

[1] Prepared by adding acetone to an aqueous ethanolic solution of benzenesulfonylhydrazine at 65° C. and reacting 36 parts of the acetone azine thus obtained (M. P. 139–149° C.) with 200 parts of liquid hydrogen cyanide. The benzenesulfonylhydrazoisobutyronitrile recrystallized from toluene melted at 116–119° C.

[2] Prepared by reacting isobutyraldehyde (3.6 parts) with benzoylhydrazide (6.8 parts) in 95% ethanol (25 parts) containing acetic acid (0.3 part) and reacing the resulting crystalline hydrazine (M. P. 125–128° C.) with liquid hydrogen cyanide. The benzoylhydrazoisovaleronitrile melted at 125–128° C.

[3] Prepared by reacting the benzoylhydrazone of acetone with liquid hydrogen cyanide. The benzoylhydrazoisobutyronitrile melted at 120–123° C.

EXAMPLE XVIII-A

A glass vessel was charged with 13.2 parts of acrylonitrile, 70 parts of water, 40 parts of ethanol, 0.63 part of 1 - benzenesulfonyl - 1 - methylhydrazoisobutyronitrile $(C_6H_5SO_2N(CH_3)NHC(CH_3)_2CN)$ five parts of an aqueous solution containing cupric chloride in a 0.025 molar concentration and 5.7 parts of a 3% solution of hydrogen peroxide. After two and a half hours at 28° C., a 65% conversion of monomer to polymer was obtained.

EXAMPLE XVIII-B

A glass container was charged with 15.6 parts of vinyl chloride, 56 parts of ethyl alcohol, 50 parts of water, 0.63 parts of 1-benzenesulfonyl-1-methylhydrazoisobutyronitrile, five parts of an aqueous solution containing cupric chloride in a 0.025 molar concentration and 5.7 parts of a 3% solution of hydrogen peroxide. After four hours at 32° C., 6.4 parts of polyvinyl chloride was obtained corresponding to a 41% yield.

EXAMPLE XVIII-C

A glass vessel was charged with 40 parts of absolute ethanol, 50 parts of water, 13.2 parts of acrylonitrile, 0.59 part of benzenesulfonylhydrazoisobutyronitrile, 1.04 parts of cumene hydroperoxide and 0.02 part of cupric chloride dihydrate. In one hour at 28° C., the conversion of monomer to polymer was 81% of the theoretical.

The preparation of these acylhydrazinoalkanonitriles is set forth in greater detail in my copending application Serial No. 141,866, filed February 1, 1950, which also discloses the use of the acylhydrazinoalkanonitriles in the polymerization of polymerizable ethenoid compounds.

EXAMPLE XIX

A glass container was charged with 56 parts of absolute ethanol, 50 parts of water, 15.6 parts of vinyl chloride, 0.59 part of benzenesulfonylhydrazoisobutyronitrile, 5.7 parts of a 3% solution of hydrogen peroxide, and 0.02 part of cupric chloride. In eight hours at 25° C., a 36% conversion to polyvinyl chloride occurred.

EXAMPLE XX

When the general procedure of Example XIX was repeated except that (a) 0.5 part of benzoylhydrazoisobutyronitrile was employed as the hydrazino compound and (b) the time was increased to 72 hours, a 48% yield of polyvinyl chloride resulted.

EXAMPLE XXI

When the general procedure of Example XIX was repeated except that the hydrazino compound consisted of 0.5 part of 1-p-carboxybenzenesulfonyl-2-phenylhydrazine $(p-HOOCC_6H_4SO_2NHNHC_6H_5)$ and the time was 22 hours, a 21% yield of polymer was obtained.

EXAMPLE XXII

A solution consisting of 13.2 parts of acrylonitrile, 78 parts of cyclohexane, 0.59 part of benzenesulfonylhydrazoisobutyronitrile, 0.61 part of 1-hydroxycyclohexylhydroperoxide, and 0.05 part of copper n-butyl phthalate was maintained at 27° C. for 19 hours. A 66% yield of polymer was obtained.

EXAMPLE XXIII

A glass container was charged with 13.2 parts of acrylonitrile, 40 parts of absolute ethanol, 40 parts of water, 0.50 part of 1-ethylsulfonyl-2-phenylhydrazine $(C_2H_5SO_2NHNHC_6H_5)$, 5.7 parts of aqueous 3% hydrogen peroxide, and 0.05 part of cupric chloride dihydrate. In one hour at 25° C., a 65% conversion to polymer was obtained.

EXAMPLE XXIV

A glass vessel was charged with 13.2 parts of acrylonitrile, 220 parts of water, 0.43 part of benzenesulfonylhydrazide, 5 parts of 0.5 N hydrochloric acid, 5 parts of 0.025 molar cupric chloride and 0.42 part of potassium bromate. After seven hours at 25° C., 38% of the monomer had been converted to polymer.

When the above general procedure was repeated except that the hydrazide was omitted, no polymerization occurred in 72 hours at 25° C.

EXAMPLE XXV

When the general procedure of Example XXIV was repeated except that 0.34 part of benzoylhydrazide was employed as the hydrazide, 17% conversion of monomer to polymer took place in seven hours at 25° C.

EXAMPLE XXVI

When the general procedure of Example XXIV was repeated except that 30 parts of water and 40 parts of ethanol was used in place of the 220 parts of water and 0.60 part of benzenesulfonylhydrazoisobutyronitrile was used in place of the hydrazide of Example XXIV, a 33% yield of polymer was obtained in seven hours at 25° C.

The process of this invention is of generic application to the addition polymerization of polymerizable compounds having the non-aromatic, or ethylenic, $>C=C<$ group. It is particularly applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the $CH_2=C<$ group.

Compounds having a terminal methylene which are subject to polymerization and copolymerization with the initiators of this invention include olefins, e. g., ethylene, isobutylene; acrylyl and alkacrylyl compounds, e. g., acrylonitrile, methyl acrylate, ethyl methacrylate, methacrylic acid, methacrylamide; vinyl and vinylidene halides, e. g., vinyl fluoride, vinylidene chloride; vinyl carboxylates, e. g., vinyl acetate, vinyl trimethyl-acetate; vinyl imides, e. g., N-vinylphthalimide; N-vinyllactams, e. g., N-vinylcaprolactam; vinyl aryls such as styrene and other vinyl derivatives such as the vinylpyridines, methyl vinyl ketone and vinyl ethyl ether.

Polyfluoroethylenes, including tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that similarly may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, may be effected by the process of this invention. Furthermore, the term "polymerization" includes within its scope (in addition to the polymerization of a monomer alone or of two or more monomers, i. e., copolymerization) the polymerization of unsaturated monomers in the presence of a chain transfer agent, e. g., carbon tetrachloride. This latter process has been called "telomerization." See U. S. 2,440,800 and Bennett-Concise Chemical and Technical Dictionary (Chemical Publishing Co., 1947), page 1054.

This invention is applicable to the polymerization of any unsaturated compound subject to addition polymerization by prior techniques. Optimum conditions may vary from monomer to monomer, and since liquid phase polymerization is desired, gases such as ethylene and propylene require pressure.

The polymerizations are usually carried out at —20° C. to 60° C. Temperatures may be lower, however the rate of polymerization is generally low. Higher temperatures may be used particularly when the time of polymerization is to be kept at a minimum, e. g., in a continuous process. In general the time required for substantial polymerization depends upon other variables, such as the specific temperature and concentrations of monomer catalyst, etc. Times of from one to twenty-four hours are customarily employed although the polymerization may require only a few minutes.

The polymerization may be carried out by conventional means. Liquid media in which the catalyst, monomer, and diluent are uniformly distributed, e. g., solutions or emulsions are particularly useful and in general aqueous systems are preferred. The acyl hydrazide must be in solution in the polymerization system, i. e., present in a liquid phase. Thus it may be dissolved in the organic phase of emulsion systems or it may be dissolved in the aqueous phase thereof. Where the hydrazide is not soluble in water it may be brought into solution therein by the use of a solvent therefor which is miscible with water. Thus in Examples XVIII through XXI and XXVI, alcohol was used to bring the hydrazide into aqueous solution. Other solvents miscible with water may be used. Lower (1 to 4 carbon) alkanols are preferred.

The acylhydrazine compounds which may be employed in the process of this invention include both carboxyl acyl RCO— and sulfonyl acyl $RSO_2$— hydrazides. See Hackh's Chemical Dictionary, Third Edition, page 18. The process is therefore applicable not only to the acyl hydrazides of the above examples but to acyl hydrazides in general and particularly those which have hydrogen on each hydrazine nitrogen whether carboxylic acid acyl hydrazides or sulfonic acid acyl hydrazides, including, in addition to those of the examples, 1-ethanesulfonyl-2-phenylhydrazine ($C_6H_5NHNHSO_2C_2H_5$), acetyl-hydrazoisobutyronitrile, benzoylhydrazo-2-methylisovaleronitrile, and benzoylhydrazo-1-cyclohexane-carbonitrile. The aromatic hydrocarbon sulfonyl hydrazide compounds are generally preferred. The hydrazine compounds are generally present in amounts of 0.01 to 5% based on the weight of polymerizable monomer. My copending U. S. Patent No. 2,580,919 discloses the preparation of suitable aracylhydrazo nitriles having cyano and aracylhydrazo on the same carbon.

The cupric ion is present in small amounts, generally in amounts of 0.001 to 20% based on the hydrazine compound present. Suitable sources of the cupric ion are soluble cupric salts such as cupric sulfate and cupric halides.

Oxidizing agents of the class consisting of bromate ion (e. g., from alkali metal bromates such as sodium bromate), periodate ion (e. g., from alkali metal periodates such as sodium and potassium periodates), peroxy compounds (e. g., hydrogen peroxide, benzoyl peroxide, acetyl peroxide, cyclohexene ozonide, benzoyl and acetyl hydroperoxides), aliphatic vicinal diketones (e. g., vicinal alkanediones such as 1,2-cyclohexane diketone and 2,3-pentanedione but especially diacetyl) and quinones are required to achieve maximum rate of polymerization. Of the oxidizing agents, peroxy compounds and periodate ion are preferred. The oxidizing agents employed are generally present in amounts of from 0.1 to 100% based on the weight of hydrazine compound. Perchlorate, chlorate, iodate, and nitrate ions seem not to be active as initiators in these systems.

As illustrated by the examples, the process of this invention results in rapid polymerizations of polymerizable monomers at low temperatures.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the polymerization of acrylonitrile, the improvement wherein said monomer is brought into contact with an acyl hydrazine, the acyl group replacing a hydrazine hydrogen, cupric ion, and an oxidizing agent of the class consisting of periodate and bromate ions, peroxy compounds, vicinal aliphatic diketones, and quinones.

2. In the polymerization of acrylonitrile, the improvement wherein said monomer is brought into contact with an acyl hydrazine, the acyl group replacing a hydrazine hydrogen, having hydrogen on each hydrazine nitrogen, cupric ion, and an oxidizing agent of the class consisting of periodate and bromate ions, peroxy compounds, vicinal aliphatic diketones, and quinones.

3. Process of claim 2 wherein the acyl hydrazine is a hydrazide of an aromatic hydrocarbon sulfonic acid.

4. In the polymerization of acrylonitrile, the improvement wherein said monomer is brought into contact with an acyl hydrazine, the acyl group replacing a hydrazine hydrogen, having hydrogen on each hydrazine nitrogen, cupric ion, and a vicinal aliphatic diketone.

5. In the polymerization of acrylonitrile, the improvement wherein said monomer is brought into contact with an acyl hydrazine, the acyl group replacing a hydrazine hydrogen, having hydrogen on each hydrazine nitrogen, cupric ion, and diacetyl.

6. In the polymerization of acrylonitrile, the improvement wherein said monomer is brought into contact with an acyl hydrazine, the acyl group replacing a hydrazine hydrogen, having hydrogen on each hydrazine nitrogen, cupric ion, and a peroxy compound.

7. In the polymerization of acrylonitrile, the improvement wherein said monomer is brought into contact with an acyl hydrazine, the acyl group replacing a hydrazine hydrogen, having hydrogen on each hydrazine nitrogen, cupric ion, and hydrogen peroxide.

8. In the polymerization of acrylonitrile, the improvement wherein the monomer is brought into contact with an aqueous solution of an acyl hydrazine, the acyl group replacing a hydrazine hydrogen, having hydrogen on each hydrazine nitrogen, cupric ion, and an oxidizing agent selected from the class consisting of periodate and bromate ions, peroxy compounds, vicinal aliphatic diketones, and quinones.

9. Process of claim 8 wherein the acyl hydrazine is a hydrazide of a sulfonic acid.

10. Process of claim 8 wherein the acyl hydrazine is a hydrazide of a hydrocarbon sulfonic acid.

11. Process of claim 8 wherein the acyl hydrazine is a hydrazide of a carboxylic acid.

12. Process of claim 8 wherein the acyl hydrazine is a hydrazide of a hydrocarbon carboxylic acid.

13. Process of claim 8 wherein the acyl hydrazine is a hydrazide of an aromatic hydrocarbon sulfonic acid and the oxidizing agent is hydrogen peroxide.

References Cited in the file of this patent

UNITED STATES PATENTS

| Number | Name | Date |
|---|---|---|
| 2,380,617 | Stewart | July 31, 1945 |
| 2,405,950 | Hanford | Aug. 20, 1946 |
| 2,496,864 | Fiedler | Feb. 7, 1950 |
| 2,589,258 | Howard | Mar. 18, 1952 |
| 2,601,293 | Howard | June 24, 1952 |